××     PRIMARILY ACID PHASE

– –     EMULSION CONTAINING VARYING AMOUNTS OF ACID, BUT GENERALLY LESS ACID THAN HYDROCARBON.

United States Patent Office 2,817,692
Patented Dec. 24, 1957

2,817,692

CATALYTIC ALKYLATION AND SOLVENT EXTRACTION

Joe E. Penick, Augusta, Kans., and Carvel C. Stapleford, Woodbury, N. J., assignors to Socony Mobil Oil Company, Inc., a corporation of New York Application August 7, 1953, Serial No. 372,912

16 Claims. (Cl. 260—683.4)

This invention has to do with a catalytic alkylation process. More specifically, the invention relates to an improved tower alkylation procedure in which hydrogen fluoride is the catalyst, and also relates to novel reaction trays upon which the alkylation is effected.

This application is a continuation-in-part of application Serial No. 269,698, filed February 4, 1952, now abandoned.

In recent years, catalytic alkylation with hydrogen fluoride as the catalyst has become an important chemical tool for preparing alkylated hydrocarbons and alkylated hydrocarbon derivatives. Representative of the valuable products so prepared today in large quantity are isoparaffins and alkyl-substituted benzenes of gasoline boiling range, and alkyl-substituted aromatics suitable for conversion to surfactants, namely, detergents, wetting agents and the like. In the development of this chemical tool, reaction was effected initially by bringing into contact an isoparaffin and an olefin, for example, with hydrogen fluoride in a typical reaction vessel for conducting chemical reactions. Descriptions of such operations are numerous, typical of which are those provided in U. S. Letters Patent 2,267,730 and 2,344,015.

A more recent development involves the use of a tower for performing the alkylation. The tower includes an intermediate zone—serving as a reaction section—made up of a reactor tray or trays on which the charge is in contact with hydrogen fluoride; a rectifying section thereabove wherein low boiling materials are refluxed; and a stripping section therebelow wherein low boiling materials and hydrogen fluoride are stripped from the alkylate product. Details of tower alkylation operations are provided in U. S. Letters Patent 2,430,333, 2,471,211 and 2,509,028. It is with such operations that this invention is concerned.

Although tower alkylation is a most effective means for preparing isoparaffins of gasoline boiling range, for example, there are certain characteristic operating difficulties. It has been established earlier that one of the factors which determines the yield and quality of such isoparaffins (or "alkylate"), is the strength of the hydrogen fluoride employed. [The strength of hydrogen fluoride is customarily reported as percent by weight of titratable acid.]. By way of illustration, it has been found that optimum yields of an aviation grade "alkylate" are obtained from an isobutane-butene charge, by maintaining a titratable acidity of about 91 weight percent when operating at 90° F., and about 94 weight percent when operating at about 60° F. It has also been established earlier that optimum yield and quality of "alkylate" are realized by maintaining at least about fifty volume percent of hydrogen fluoride in the reaction emulsion. These operating conditions, and the excellent performance achieved therewith, have necessitated recycle of a substantial quantity of spent or partially spent hydrogen fluoride from a point below a reactor tray—in the reaction section—to a point above the reactor tray. This acid recycle procedure, thus, provides a sufficient quantity of hydrogen fluoride on the reactor tray. However, this procedure is disadvantageous because recycling of large volumes of hydrogen fluoride makes necessary the use of large acid pumps and a considerable amount of accessory equipment—all of which increases initial installation cost and mechanical maintenance expense. In addition, recycling of spent or partially spent acid to the reactor tray serves to reduce the strength of acid on the tray such that excessive quantities of alkyl fluorides are formed.

Shortcomings of prior tower alkylation procedures, as outlined above, have now been overcome in a large measure by development of a new operating technique. The present invention involves introducing hydrogen fluoride (HF) of desired strength onto the reactor tray in such a manner that the only acid entering the reactor tray is acid of desired strength, and recycling to the tower only that acid which is removed overhead from the tower with the hydrocarbon overhead; acid so recycled directly to the tower is returned to the tower top in admixture with hydrocarbon reflux such that only one reflux pump is necessary.

One effective means contemplated herein for providing hydrogen fluoride of desired strength to the reactor tray involves recycling hydrogen fluoride to a saturator tray below the reactor tray in order to saturate with HF the vapors rising through the tower to the reactor plate.

The present invention also contemplates conducting the alkylation on a bubble cap tray of novel design. The new reactor tray includes a bubble cap or caps; and a baffle interposed between the bubble cap or caps and the remainder of the reactor plate, the height of the baffle being related to the height of the bubble cap or caps. Thus, a mixing zone is defined by the baffle, bubble caps and the walls of the vessel containing the tray; and a quiescent settling zone is defined by the baffle and the remainder of the tray.

The objects and advantages of the invention will be more clearly understood from the description below of preferred embodiments of the invention, apparatus for which is shown in the annexed drawings, wherein.

Figure 1:
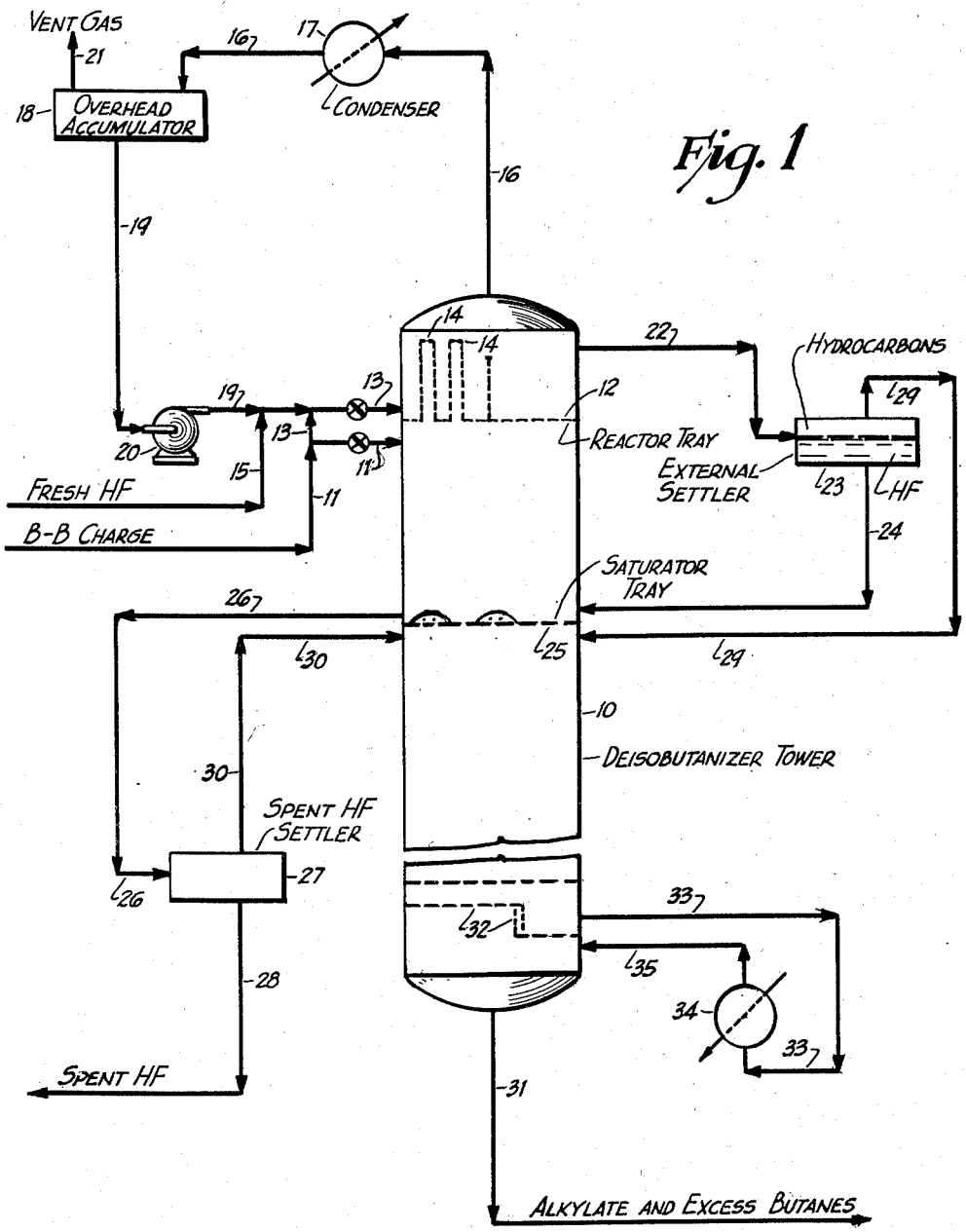
Figure 1 is a diagrammatic representation of apparatus for practicing the invention.

As shown in Figure 1, the principal element employed in practice of the invention is a bubble tower 10, generally having 30 or more trays. Illustrating the invention with the reaction of isobutane with butenes in the presence of hydrogen fluoride to produce an "alkylate" suitable for use in aviation gasoline, a fresh charge (B—B) containing isobutane and butenes is supplied in the vapor phase through valved inlet line 11 to the vapor space below the single reactor tray 12 shown for simplicity of illustration. Mixing jets (not shown) can be secured to the tower end of line 11 to provide a fine vapor spray. As shown, the B—B feed can also be introduced in the liquid phase through valved line 13 to the liquid above the reactor tray 12.

On the reactor tray 12, which is the top tray in the tower, is a deep body of liquid through which passes a vapor mixture admitted by the bubble caps 14 on the tray. Hydrogen fluoride (serving to catalyze the alkylation reaction) is added in liquid phase through inlet line 13, which connects with HF supply line 15. The HF is so added directly onto the reactor tray 12 and a bed of liquid HF is maintained on the tray. Vapors rising through the bubble caps 14 on tray 12 provide the agitation to obtain contact between the hydrocarbon reactants and HF. The HF on the reactor tray and isobutane recycle (provided as indicated below) serve to cool the reactor tray section of the tower, by removing heat of reaction as well as heat of condensation of vapor phase reactants and/or sensible heat of preheated reactants. The said cooling is accomplished by evaporation of isobutane and HF, the resulting vapors passing up into the section of the tower above the reactor tray 12 and out the top of the tower through line 16 to condenser 17, wherein they are condensed. The section of the tower above reactor tray 12 thus serves as a rectifying section. The condenser vapors comprising, for example, about 12 mol percent HF and about 88 mol percent hydrocarbons, are collected in overhead accumulator 18. Hydrocarbons—predominantly isobutane—and some HF are withdrawn, in the form of an emulsion, from accumulator 18 through line 19 and pump 20, and are returned through line 13 to the top of tower 10 to serve as reflux. Introduction of the isobutane as reflux serves to effect the desired rectification, provides the desired concentration of this reactant in the reaction section comprising the reactor tray, and removes the heat of reaction from the tower. Since the principal hydrocarbon component of the reflux is isobutane, the ratio of reflux to charge determines the concentration of isobutane on the reactor tray, which, in turn, is a major factor influencing alkylate quality.

Any propane and lighter hydrocarbons taken from tower 10 through line 16 and accumulator 18, are withdrawn from the system through line 21.

Liquid downflow from the rectifying section of tower 10 above tray 12 is removed through line 22 to external settler 23. As shown, outlet line 22 is positioned somewhat lower than the top of bubble caps 14 and somewhat higher than the top of the baffle (described hereinafter) defining a settling zone. In 23, a lower layer of HF is formed; this is taken through line 24 and is introduced into tower 10 above the second tray therein, the acid saturator tray 25. Thus, vapors rising from tray 25 become saturated with HF. It will be apparent, therefore, that HF vapors rise from acid saturator tray 25 through tower 10 and pass through bubble caps 14 on reactor tray 12 and thus mix with the hydrocarbon-HF charge. Liquid HF from saturator tray 25 is taken from the tower through line 26 to spent acid settler 27. Outlet line 26 is positioned such that it joins tower 10 at a level somewhat below the top of the bubble caps on saturator tray 25. In 27, a lower layer of HF is formed and this is withdrawn from the system through line 28 for regeneration. Regenerated acid is reintroduced through line 15.

Referring again to external settler 23, an upper layer comprising hydrocarbons is formed therein. The hydrocarbons are taken from 23 through line 29, and are returned to the tower below the acid saturator tray 25, for example at the third tray in the tower. The section of the tower below the acid saturator tray 25 serves as a stripping section, stripping dissolved HF out of the hydrocarbon downflow and makes possible a separation of isobutane (which is needed in the reaction section) and normal butane (which should be eliminated from the reaction section).

Also returned to the tower below the acid saturator tray 25, together with hydrocarbons in line 29, are the hydrocarbons from the spent HF settler 27. An upper layer of hydrocarbon forms in 27 and is removed therefrom through line 30.

Deisobutanizer tower bottoms, comprising the alkylate product and normal butane plus any excess isobutane present in the charge, are removed from the tower 10 through line 31. The bottoms are taken to a stabilizer (not shown) where total alkylate of desired character is obtained.

The lower portion of tower 10 is provided with baffles 32 and line 33, containing heater 34, such that a controlled amount of liquid product can be removed from the tower and then can be reintroduced through line 35 in order to adjust the temperature of the product removed through line 31.

Figure 2:
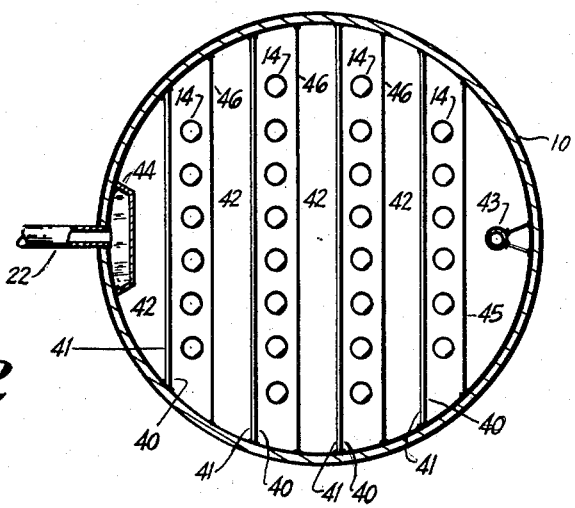
Figure 2 is a plan view of the novel reactor tray for accomplishing the purposes of the invention.

As indicated above, Figure 2 is a plan view of a novel reaction tray of the character contemplated herein, for providing for contact of liquid with vapor, and associating therewith a quiescent zone and return of liquid to a liquid-vapor contacting zone. In Figure 2, the tray 12 has baffles 40 and 41 interposed between each row of bubble caps 14. Thus, the space between each row of bubble caps 14 is a quiescent or settling zone 42. Baffles 40 are intended to prevent vapors issuing from bubble caps 14, from entering acid settling zones 42 and thereby disturbing the separation of acid from hydrocarbon phase in zones 42. Baffles 41 serve to define and separate the settling zones 42 from the bubble cap area. Acid settled out in zones 42 returns to the bubble cap area by passing under the lower edge of baffles 41, upward between baffles 41 and 40, and over the top of baffles 40. This passageway for the return of separated acid serves the same function as the gap between the end of the baffle and the wall of the tower when a baffle extending only part way across the tower is used.

A downcomer from a tray above is indicated as 43, and an overflow weir to the tray below is indicated as 44. Weir 44 determines the depth of liquid on tray 12, and is shorter in height than the bubble caps 14. It will be recognized that downcomer 43 is omitted when tray 12 is the top tray in the tower, and is included only when tray 12 is positioned below another tray (not shown) in the tower. Baffle 45 serves to prevent vapors issuing from bubble caps 14 from entering downcomer 43 and thereby impairing the pressure sealing capacity of downcomer 43. Baffles 46 serve to separate the settling zones 42 from the adjacent bubble cap area. Baffles 46 can be of the same height as baffles 41, but are preferably higher than baffles 41 and shorter than overflow weir 44. In addition to defining the settling zones 42, baffles 46 (having no passageway for the flow of settled acid) tend to prevent the recirculation of acid phase from the outlet to the inlet side of the tray 12. Line 22 is the exit line from tray 12.

The size and shape of the baffles 40 and 41 are such that the vapors issuing from the bubble caps 14 do not disturb the quiescent nature of the settling zones 42. The height of the baffles 41 is an important consideration. In order to maintain quiescent settling zones 42, it is desirable that the height of baffles 41 be from about 25 percent to about 75 percent of the height of the bubble caps 14. Preferably, however, the height of baffles 41 is approximately one-half the height of the bubble caps 14. The minimum height of baffles 41 must be higher than slots 47 (shown in Figure 3, below) of the bubble caps through which vapor issues. It is also required that the top of weir or baffle 44 be positioned in tower 10 at a level above the top of baffles 41.

Figure 3:
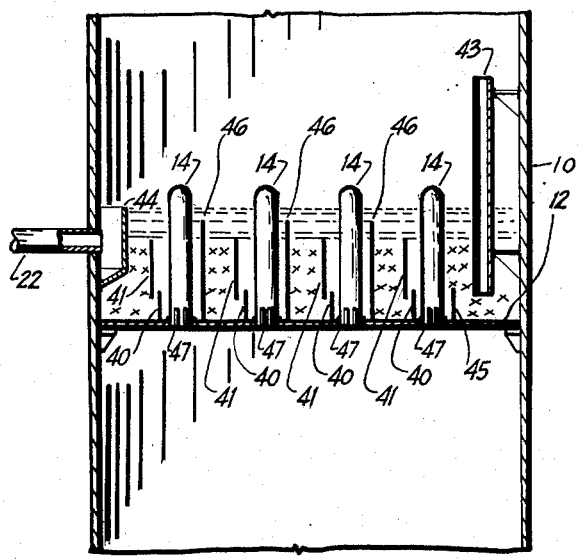
Figure 3 is a sectional elevation of the reactor tray.

Figure 3 is a sectional elevation of reactor tray 12, with bubble caps 14, baffles 40, 41 and 46 and settling zones 42 as shown. Thus, the tray will retain a bed of HF-hydrocarbon emulsion several inches in depth. The settling zones 42 between each row of bubble caps 14 makes possible an internal acid circulation on the tray 12 and also makes possible provision of an acid phase of desirably high acid content, as 90 percent or greater, about the base of the bubble caps. The baffles 40 and 41 prevent the rising vapors of HF and hydrocarbons from disturbing the settling zones and allow the settled acid, due to its greater density, to flow back to the bubble caps 14.

From the foregoing description of Figures 1 through 3, it will be seen that the present invention provides for an acid settling zone shielded from vapor bubbles with a passageway for the return of settled acid to the bubble cap area, the passageway being either shielded or so located that it is not subjected to direct impingement of vapor streams issuing from the slots of the bubble caps. A single baffle arrangement defined by 40 and 41 extending part way across the tower is advantageous for use in small towers, whereas the baffle arrangement illustrated in Figures 2 and 3 is more suitable for large towers.

It has been found that the new reactor plate and the technique of introducing only acid of desired strength thereto, cooperate to provide an acid of high strength where it is needed in the system. In this way, the formation of alkyl fluorides is reduced to a lower level than previously obtained. Also, by maintaining a higher acid strength on the reactor plate 12 than previously, the difference between the strength of the acid on the reactor plate and that of the spent acid is greater. This indicates that the present operating technique regenerates in the tower a higher percentage of acid than previously, thus reducing the external acid regeneration requirements. It follows, then, that investment and operating costs for acid regeneration equipment are reduced substantially.

It will be understood that Figures 1, 2 and 3, above, are representative of the invention and that miscellaneous features are not shown therein. For example, reactor tray 12 can be secured to the walls of tower 10 by suitable means such as welding (not shown). Also, it is contemplated that a number of conventional bubble trays can be positioned above the reactor tray 12 in the tower 10, such bubble trays serving as rectifying trays. The latter can be used, if desired, for effecting separation of isobutane and lighter hydrocarbons from the heavier hydrocarbons.

Data in Table I below contains results of typical operations following the procedure of Figure 1, that is, with no spent-acid recycle to the reactor tray 12 and no rectifying trays above the reactor tray 12.

TABLE I

*Process data from deisobutanizer tower pilot unit*

| Run No. | B-12 | B-25 | B-26 |
|---|---|---|---|
| Charge Stock, L. V. percent: | | | |
| $C_2$ + Lighter | | 3.0 | 3.0 |
| $C_3$ | 3.5 | 15.7 | 15.7 |
| $C_3=$ | 1.1 | 9.4 | 9.4 |
| $iC_4$ | 41.3 | 49.7 | 49.7 |
| $C_4=$ | 27.6 | 10.2 | 10.2 |
| $nC_4$ | 26.5 | 12.0 | 12.0 |
| DIB Tower Conditions: | | | |
| Pressure, p. s. i. g. | 90 | 185 | 180 |
| Overhead Drum, °F | 63 | 100 | 101 |
| Tower Top, °F | 96 | 128 | 130 |
| Reactor Tray, °F | 103 | 141 | 141 |
| Vaporized Charge, °F | 140 | 152 | 150 |
| Reboiler, °F | 195 | 270 | 250 |
| Reflux to Olefin Ratio, Vols. Reflux/Vol. Olefin Chg. | 27.8 | 22.4 | 11.0 |
| Acid Charge: | | | |
| Wt. Percent HF | 90.0 | 89.7 | 89.8 |
| Spent Acid: | | | |
| Wt. Percent HF | 86.5 | 86.6 | 87.0 |
| Rate, Lbs./Gal. Alkylate | | 1.7 | 1.4 |
| Yields: | | | |
| Total Alkylate/Olefin, Vol./Vol. | 1.78 | 1.86 | 2.08 |
| Isobutane Consumed/Olefin, Vol./Vol. | | | 1.67 |
| Total Alkylate Octanes: | | | |
| CFR-M, Clear | 91.3 | 88.2 | 87.7 |
| CFR-M, + 1.0 cc. TEL | | 93.0 | 91.8 |
| CFR-M, + 3.0 cc. TEL | Iso+0.30 | 97.3 | 95.5 |
| CFR-R, Clear | 93.7 | 90.3 | 89.8 |
| CFR-R, + 1.0 cc. TEL | | 96.0 | 95.6 |
| CFR-R, + 3.0 cc. TEL | Iso+0.21 | Iso+.02 | 100 |
| Aviation Alkylate Octanes: | | | |
| F-3 Method, + 4.0 cc. TEL | Iso+0.53 | | |
| F-4 Method, + 4.0 cc. TEL | S+2.0 | | |

It was also found that, under the operating conditions shown in Table I, acid in the reaction emulsion on the reactor tray 12 was 95 weight percent; and the fluorides in the tower bottoms was 0.01–0.02 weight percent.

In keeping with earlier findings, it is desirable to provide a fairly deep bed of hydrogen fluoride on the reactor tray 12 in order to achieve satisfactory alkylation. The pool of catalyst should be in excess of one inch in depth and preferably on the order of four to twelve inches, more or less. Another consideration previously found to be important is the size of the particles of vapor phase charge rising through the catalyst. The finer the subdivision of the charge at the point of introduction, the better the contact between reactants and catalyst. It has been found that better alkylation is realized with fine atomization of the charge into the catalyst, efficiency decreasing rapidly as the size of the particles of charge is increased. However, the pressure drop across a very small orifice is very high, requiring a long downcomer to the next tray below in order to balance the pressure and prevent blowing the vapor up through the downcomer. Excessive distance between trays must obviously be avoided to keep down the cost of commercial installations. A balance must be struck among these several factors affecting bubble slot size. For example, in connection with the specific reaction tray 12, slots 3/32" wide and 1" high, with 32 per tray, have been found to be satisfactory.

A fine dispersion is desirable for optimum operation of the process. This requires small slots and a sufficiently high pressure drop to insure substantially constant flow through each slot.

Conventional alkylation conditions of temperature, pressure, time, isoparaffin-olefin ratio and HF-hydrocarbon ratio can be employed advantageously in the process contemplated herein. For example, the alkylation of isobutane with butenes can be carried out at temperatures between about 0° F. and 150° F., preferably between about 40° F. and 140° F., at pressures at least sufficiently high to keep the hydrocarbons and HF in the liquid phase, and with isobutane-butene ratios of between 2:1 and 15:1, preferably between about 6:1 and 10:1. Ratios of isobutane to butene of at least 2:1 are essential since lower ratios tend to cause polymerization of the butenes with resultant decrease in yield of the alkylate product and/or excessive reaction between the butenes and the primary alkylate product because of the relatively low ratios of isobutane to alkylate product in the reaction mixture. The HF charged to the tower should be substantially anhydrous and can have a titratable acidity as low as 75 percent by weight and is preferably between about 85 and 95 percent. The ratio of HF to hydrocarbon charge can be varied considerably, but most satisfactory results are obtained with an excess of HF. As pointed out above, ratios of HF to hydrocarbon on the vapor-liquid contacting portion of the reactor tray, of at least 1:1 are used, with a ratio of about 2:1 being preferred.

Although the foregoing description has been directed to alkylation of isobutane with butenes in the presence of hydrogen fluoride, it will be understood, of course, that the invention is applicable also to alkylation of other hydrocarbons in the presence of HF. By way of illustration, $C_7$ and $C_8$ alkylates can be prepared from isobutane and mixtures of propylene and butenes; so also, $C_9$ alkylates can be obtained by alkylation of isobutane with pentenes. As a further illustration of the process, cumene can be prepared herein by reaction of benzene with propylene. In general, then, the invention is suitable for alkylation of alkylatable hydrocarbons, particularly low boiling isoparaffins, with alkylating agents, particularly low-boiling olefins.

Figure 4:
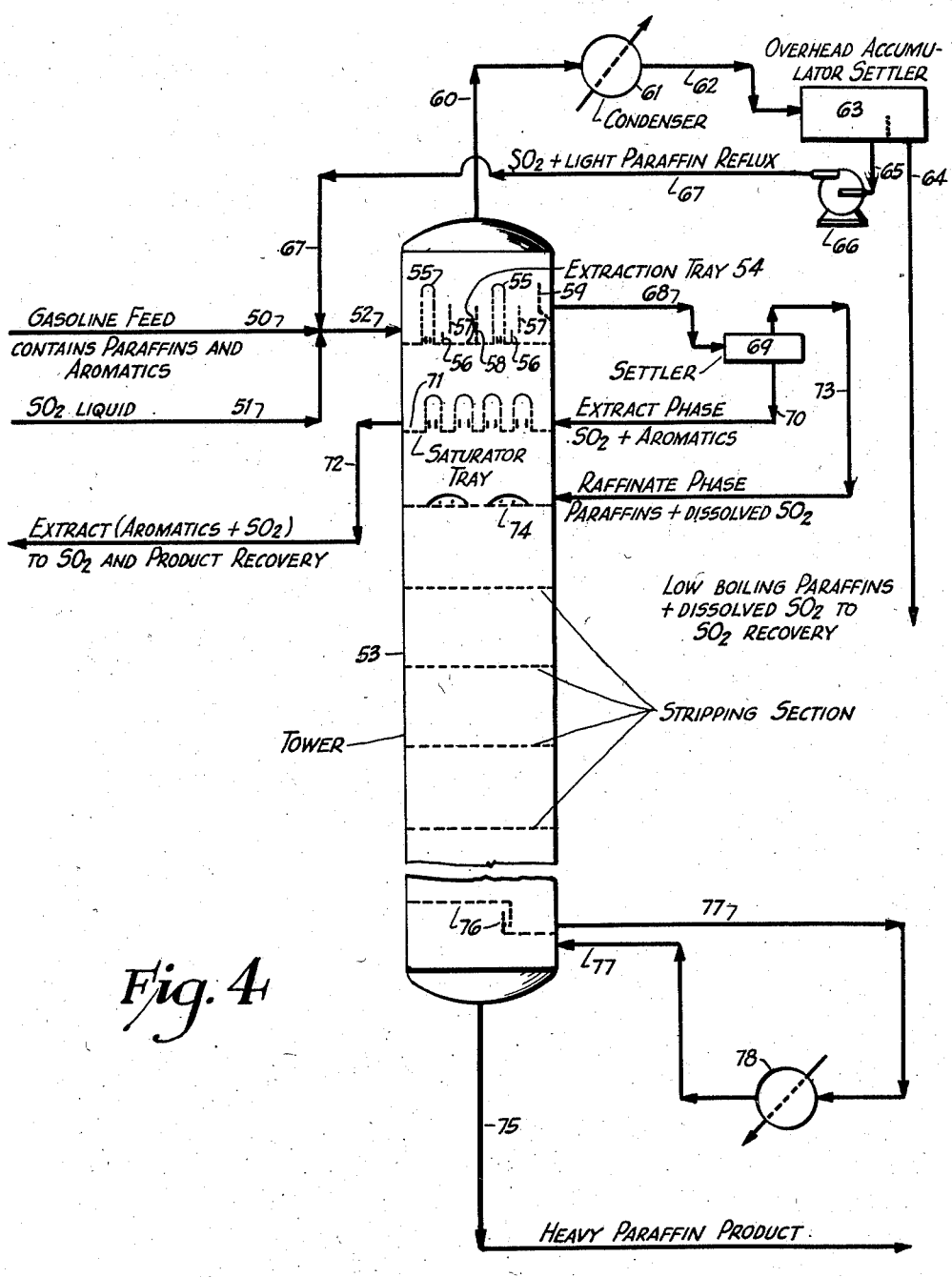
Figure 4 is another diagrammatic representation of apparatus for practicing the invention.

Another aspect of the invention is illustrated by Figure 4 which is concerned with a separation of aromatics from gasoline streams by solvent extraction. This is representative of contacting a hydrocarbon (gasoline, here) and a partially immiscible liquid ($SO_2$, here) on a bubble tray, as contemplated herein. A gasoline stream containing paraffins and aromatics, in line 50 and liquid sulfur dioxide (or other suitable solvent selective for aromatics or paraffins) in line 51, are combined in line 52 and introduced into tower 53. As indicated, the hydrocarbons and $SO_2$ are introduced in the liquid phase, to tower 53 above extraction tray 54. Tray 54 is equipped with bubble caps 55, baffles 56, 57 and 58, and overflow weir 59; thus, the tray is similar to tray 12 of Figure 1, above.

A body of liquid-hydrocarbons and $SO_2$— is maintained on tray 54, with a vapor mixture being admitted through bubble caps 55 and thus coming into intimate contact with the liquid. $SO_2$ selectively extracts aromatics from the hydrocarbon charge, and rejects paraffins. Vapors rising from tray 54, primarily $SO_2$ and light or low boiling paraffins, flow up into the top of tower 53 and out of the tower through line 60 to condenser 61, wherein they are condensed. The top of tower 53 above tray 54 functions as a rectifying section. When required, the stripping section can contain one or more conventional rectifying trays. The condensate is then taken through line 62 to overhead accumulator-settler 63. A portion of the condensate in 63 comprising low boiling paraffins and dissolved $SO_2$, is removed from the system through line 64. $SO_2$ can be recovered from the stream in line 64, by any conventional means, and can be reused in line 51. The remainder of the condensate in 63 is returned for reflux to the tower via line 65, pump 66, line 67 and line 52.

Liquid downflow from the rectifying section of tower 53 above tray 54, flows over weir 59 to line 68 and hence to external settler 69. In 69, an extract phase (lower layer) and a raffinate phase (upper layer) are formed. The extract phase comprises $SO_2$ and aromatics, with a relatively minor quantity of paraffins. The raffinate phase comprises paraffins and dissolved $SO_2$, and a relatively small amount of aromatics. The extract phase is removed from settler 69 through line 70 and is returned to tower 53 above saturator tray 71. Tray 71 is a conventional bubble tray except that it does not include a downcomer. Vapors rising from a stripping section of the tower (below saturator tray 71) are saturated with $SO_2$ on tray 71. Vapors rising from tray 71 become saturated with $SO_2$, and pass up through the tower and through bubble caps 55 on extraction tray 54. Liquid from saturator tray 71 is removed from the tower 53 via line 72; the hydrocarbon portion of this liquid is predominantly aromatics with only a small amount of paraffins. The aromatic product in line 72 can be further treated by conventional means to effect removal of $SO_2$ therefrom.

Returned to the tower below saturator tray 71, is the raffinate phase in settler 69. The raffinate is taken through line 73 and is introduced into the tower onto conventional bubble tray 74. The section of the tower 53 below saturator tray 71 is a stripping section, wherein dissolved $SO_2$ and aromatics are stripped out of the downflow from extraction tray 54. The stripping section can contain one or more conventional bubble trays, such as 74.

Heavy paraffins are taken from the bottom of tower 53 through line 75. The product so removed contains substantially less aromatics than the original charge in line 50.

The lower section of tower 53 is equipped with baffles 76 and line 77, containing reboiler 78, in order that a controlled amount of liquid product can be removed from the tower and then can be returned in order to adjust the temperature of the product removed via line 75.

As shown in Figure 4, gasoline feed is introduced onto extraction tray 54. This is an advantageous procedure making possible optimum aromatic recovery. However, when an aromatic extract of highest purity is sought, the hydrocarbon feed is introduced into the tower below the extraction tray.

The principal advantage of the process described in connection with Figure 4, over conventional solvent extraction, is that it makes possible recovery of a high purity aromatic fraction boiling within a relatively narrow range from a charge stock of wide boiling range. In conventional processes, recovery of a narrow boiling range aromatic fraction requires prefractionation of the charge stock or extensive fractionation of the extract product, in order that a narrow boiling range product can be obtained.

We claim:

1. The process for alkylating an isoparaffin with an olefin in the presence of hydrogen fluoride under alkylating conditions, which comprises: passing a stream of isoparaffin and olefin into a reaction section positioned in an upper portion of a tower; passing liquid hydrogen fluoride of desired concentration into said reaction section in the substantial absence of any hydrogen fluoride of substantially lower concentration; withdrawing a mixture of liquid hydrocarbons and hydrogen fluoride from said reaction section and separating said mixture into a predominantly hydrogen fluoride phase and a predominantly hydrocarbon phase; returning said predominantly hydrogen fluoride phase to a stripping section positioned below said reaction zone of said tower, whereby vapors rising through the tower are saturated with hydrogen fluoride; withdrawing spent hydrogen fluoride from said stripping zone; returning said predominantly hydrocarbon phase to a fractionating section positioned below said stripping zone of said tower; heating said predominantly hydrocarbon phase whereby isoparaffin and dissolved hydrogen fluoride are concentrated in a vapor stream; passing said vapor stream upwardly through said tower into the stripping section and thence to the reaction zone; withdrawing a vapor mixture from the reaction section, condensing said vapor mixture and returning a major portion of the resultant liquid to the reaction zone as reflux; and withdrawing an alkylate product from the lower portion of said tower.

2. The process of claim 1 wherein said isoparaffin and said olefin are low-boiling hydrocarbons.

3. The process of claim 1 wherein said isoparaffin is isobutane and said olefin comprises butenes.

4. The process of claim 1 wherein said isoparaffin is an alkylatable hydrocarbon and said olefin is an alkylating agent.

5. The process of claim 1 wherein the titratable acidity of the hydrogen fluoride introduced into said reaction section is about 95 weight percent.

6. The process of claim 1 wherein a rectifying section is positioned above the reaction section in said tower.

7. The process of claim 1 wherein the hydrogen fluoride is introduced into a section of the tower not lower than said stripping section.

8. The process of claim 1 wherein said isoparaffin and olefin are introduced as a vapor below said first-mentioned reaction section.

9. The process of claim 1 wherein said isoparaffin and olefin are introduced as a liquid into said first-mentioned reaction section.

10. The process for separating a vaporizable hydrocarbon mixture according to molecular type and boiling range by contacting said hydrocarbon mixture with a partially immiscible liquid in a tower, which comprises: passing said immiscible liquid to a bubble tray of said tower; passing said hydrocarbon mixture into said bubble tray, said bubble tray containing thereon a mixture of said two liquids (hydrocarbon liquid and said partially immiscible liquid) and effecting thereon intimate contact between said hydrocarbon mixture and said immiscible liquid; withdrawing a liquid mixture from said bubble tray; separating said liquid mixture, so withdrawn, into two phases; passing the heavier of said phases to a bubble tray positioned below the first-mentioned tray of said tower, whereupon vapors rising through said tower are contacted with said heavier phase; withdrawing said heavier phase from said lower tray; passing the lighter of said phases directly to a vapor-liquid contacting zone positioned below said lower tray; introducing vapor into the lower portion of said vapor-liquid contacting zone and withdrawing a vapor mixture from said first-mentioned bubble tray; and withdrawing a liquid product from the lower portion of said tower.

11. The process of claim 10 wherein said hydrocarbon mixture is introduced as a vapor below said first-mentioned bubble tray.

12. The process of claim 10 wherein said hydrocarbon mixture is introduced as a liquid onto said first-mentioned bubble tray.

13. The process for separating an aromatic hydrocarbon from a vaporizable hydrocarbon mixture containing the same and a paraffin hydrocarbon by contacting the said mixture with liquid sulfur dioxide in a tower, which comprises: passing said sulfur dioxide to a bubble tray of said tower; passing said hydrocarbon mixture into said bubble tray, said bubble tray containing thereon a mixture of said liquids (liquid hydrocarbons and liquid sulfur dioxide) and effecting thereon intimate contact between said hydrocarbon mixture and said liquid sulfur dioxide; withdrawing a liquid mixture from said bubble tray; separating said liquid mixture, so withdrawn, into two phases, an extract phase comprising sulfur dioxide and aromatic hydrocarbon and a raffinate phase comprising paraffin hydrocarbon and sulfur dioxide; passing said extract phase to a bubble tray positioned below the first-mentioned tray of said tower, whereupon vapors rising through said tower are contacted with said extract phase; withdrawing liquid extract comprising aromatic hydrocarbon and sulfur dioxide from said lower tray; passing said raffinate phase to a vapor-liquid contacting zone positioned below said lower tray in the tower; introducing vapor into the lower portion of said vapor-liquid contacting zone and withdrawing a vapor mixture from said first-mentioned bubble tray; and withdrawing paraffin hydrocarbon from the lower portion of said tower.

14. The process of claim 13 wherein the hydrocarbon mixture is a gasoline.

15. Apparatus for effecting alkylation of an isoparaffin with an olefin in the presence of hydrogen fluoride, which comprises: a fractionating means containing a reaction bubble tray, which tray comprises a base plate extending across the tower, means for depositing liquid on said plate and means for removing liquid therefrom while maintaining a predetermined depth of liquid thereon, bubble caps secured to said plate, vertical baffle means associated with said bubble caps, said baffle means being arranged to define upward passages for bubbles adjacent said caps and to prevent substantial agitation by said bubbles of liquid on said base plate and outside of the passage defined by said baffles, and means for liquid to flow from said substantially unagitated zone into the base of said upward passage formed by said baffle means; an over-flow weir located in said fractionating means above said bubble tray; a settler connected with said weir; a saturator bubble tray positioned in said fractionating means below the reaction bubble tray; means for introducing a heavy phase from said settler into said saturator bubble tray; means for withdrawing liquid from said saturator bubble tray; and means for withdrawing alkylate from the lower portion of said fractionating means.

16. A gas and liquid contacting tray for use in a vertical contacting tower, which comprises: a base plate extending across the tower; means for depositing liquid on said plate and means for removing liquid therefrom while maintaining a predetermined depth of liquid thereon; a plurality of bubble caps mounted upon said base plate; vertical baffle means associated with said bubble caps, said baffle means extending vertically through a substantial portion of the predetermined depth of liquid and the upper extremity thereof terminating below the top of the liquid removal means, said baffle means defining upward passages for bubbles emergent from said caps while permitting settling of liquid outside of said passages without substantial agitation thereof by said bubbles; and means for flowing said settled liquid into the bottom of said passages.

References Cited in the file of this patent

UNITED STATES PATENTS

| | | |
|---|---|---|
| 1,738,870 | Cox et al. | Dec. 10, 1929 |
| 1,811,247 | Smith | June 23, 1931 |
| 1,821,619 | Day | Sept. 1, 1931 |
| 1,965,549 | Holmes et al. | July 3, 1934 |
| 1,973,141 | Clarke | Sept. 11, 1934 |
| 2,045,518 | Chatfield | June 23, 1936 |
| 2,344,700 | Hutcheson et al. | Mar. 21, 1944 |
| 2,371,477 | Sonders et al. | Mar. 13, 1945 |
| 2,378,952 | Rousseau | June 26, 1945 |
| 2,430,333 | Hadden | Nov. 4, 1947 |
| 2,471,211 | Hadden | May 24, 1949 |
| 2,600,710 | Wade | June 17, 1952 |
| 2,609,277 | McNamara | Sept. 2, 1952 |